(12) United States Patent
Chan et al.

(10) Patent No.: US 7,676,591 B2
(45) Date of Patent: Mar. 9, 2010

(54) SYSTEM AND METHOD FOR TRANSFERRING MULTIPLE DATA CHANNELS

(75) Inventors: Cheuk Chan, La Jolla, CA (US); Giri Anantharaman, San Diego, CA (US); Greg Sherwood, San Diego, CA (US); Osama Al-Shaykh, San Diego, CA (US); Mark Banham, San Diego, CA (US)

(73) Assignee: Packet Video Corporation, San Diego, CA (US)

( * ) Notice: Subject to any disclaimer, the term of this patent is extended or adjusted under 35 U.S.C. 154(b) by 673 days.

(21) Appl. No.: 11/498,220

(22) Filed: Aug. 2, 2006

(65) Prior Publication Data

US 2007/0076756 A1    Apr. 5, 2007

Related U.S. Application Data

(60) Provisional application No. 60/719,381, filed on Sep. 22, 2005.

(51) Int. Cl.
*G06F 15/16* (2006.01)
*G06F 11/00* (2006.01)
*H04N 7/173* (2006.01)
*H04B 1/66* (2006.01)

(52) U.S. Cl. .................. 709/231; 709/229; 370/230; 725/105; 375/240

(58) Field of Classification Search .................. None
See application file for complete search history.

(56) References Cited

U.S. PATENT DOCUMENTS

| | | | |
|---|---|---|---|
| 6,167,092 A | 12/2000 | Lengwehasatit | |
| 6,498,865 B1 | 12/2002 | Brailean et al. | |
| 6,529,552 B1 | 3/2003 | Tsai et al. | |
| 6,704,281 B1 * | 3/2004 | Hourunranta et al. | ....... 370/230 |
| 6,804,717 B1 | 10/2004 | Bakshi et al. | |
| 7,006,631 B1 | 2/2006 | Luttrell | |
| 7,139,279 B2 | 11/2006 | Jabri et al. | |
| 7,339,993 B1 * | 3/2008 | Brooks et al. | .......... 375/240.26 |

(Continued)

OTHER PUBLICATIONS

PCT Search Report, Apr. 16, 2007, Chan et al.

(Continued)

*Primary Examiner*—Wen-Tai Lin
(74) *Attorney, Agent, or Firm*—Patents+TMS, P.C.

(57) ABSTRACT

A system and a method transfer multiple data channels between a server and a terminal via a stream session over a network. The system and the method utilize a bitstream switching, a fast buffer filling and/or a fast playback start to facilitate a switch from a first data channel and a second data channel. The first data channel and/or the second data channel is delivered to and/or is transferred to the terminal from the server over the network via a streaming session. The server transfers second data of the second data channel to the terminal via one or more tracks which are encoded at more than one bitrate and/or are configured in one or more configurations. The terminal requests a change between the first track and/or the second track without terminating the stream session for the first data channel between the terminal and the server. As a result, the system and/or the method minimizes the delay period of time between requesting the switch to the second data channel and displaying the second data channel.

9 Claims, 1 Drawing Sheet

U.S. PATENT DOCUMENTS

| | | |
|---|---|---|
| 2002/0002044 A1 | 1/2002 | Naruse et al. |
| 2002/0038374 A1* | 3/2002 | Gupta et al. ................ 709/231 |
| 2002/0131496 A1* | 9/2002 | Vasudevan et al. ..... 375/240.11 |
| 2002/0136298 A1* | 9/2002 | Anantharamu et al. . 375/240.12 |
| 2002/0138619 A1* | 9/2002 | Ramaley et al. ............. 709/226 |
| 2003/0048855 A1 | 3/2003 | Klaghofer et al. |
| 2003/0067872 A1 | 4/2003 | Harrell et al. |
| 2003/0083870 A1* | 5/2003 | Lee et al. .................... 704/229 |
| 2003/0093267 A1 | 5/2003 | Leichtling et al. |
| 2003/0142744 A1 | 7/2003 | Wu et al. |
| 2004/0077313 A1 | 4/2004 | Oba et al. |
| 2004/0158645 A1 | 8/2004 | Morinaga et al. |
| 2004/0172478 A1* | 9/2004 | Jacobs et al. ................ 709/233 |
| 2004/0174817 A1 | 9/2004 | Jabri et al. |
| 2004/0193762 A1 | 9/2004 | Leon et al. |
| 2004/0218673 A1 | 11/2004 | Wang et al. |
| 2005/0008030 A1 | 1/2005 | Hoffman et al. |
| 2005/0015509 A1* | 1/2005 | Sitaraman ................... 709/231 |
| 2005/0089091 A1* | 4/2005 | Kim et al. .............. 375/240.01 |
| 2006/0013148 A1 | 1/2006 | Burman et al. |
| 2006/0029041 A1 | 2/2006 | Jabri et al. |
| 2006/0056416 A1 | 3/2006 | Yang et al. |
| 2006/0159037 A1 | 7/2006 | Jabri et al. |
| 2006/0176877 A1 | 8/2006 | Jabri et al. |
| 2006/0242240 A1* | 10/2006 | Parker et al. ................ 709/205 |
| 2007/0011277 A1 | 1/2007 | Neff et al. |
| 2007/0076756 A1 | 4/2007 | Chan et al. |
| 2007/0112935 A1 | 5/2007 | Espelien |
| 2007/0156770 A1 | 7/2007 | Espelien |
| 2007/0186003 A1 | 8/2007 | Foster et al. |
| 2007/0189275 A1 | 8/2007 | Neff |
| 2007/0220555 A1 | 9/2007 | Espelien |
| 2007/0226315 A1 | 9/2007 | Espelien |
| 2007/0233701 A1 | 10/2007 | Sherwood et al. |
| 2007/0245399 A1 | 10/2007 | Espelien |
| 2007/0276864 A1 | 11/2007 | Espelien |

OTHER PUBLICATIONS

PCT Written Opinion, Apr. 16, 2007, Chan et al.

* cited by examiner

US 7,676,591 B2

SYSTEM AND METHOD FOR TRANSFERRING MULTIPLE DATA CHANNELS

This application claims the benefit of U.S. Provisional Application Ser. No. 60/719,381, filed Sep. 22, 2005.

BACKGROUND OF THE INVENTION

The present invention generally relates to a system and a method for transferring multiple data channels. More specifically, the present invention relates to a system and a method for transferring multiple data channels from a server to a terminal via a network. First data of a first data channel may be transferred, may be sent and/or may be transmitted from the server to the terminal over the network via a streaming session which may be established between the terminal and the server. The terminal may change to, may switch to and/or may display a second data channel by requesting, by receiving and/or by displaying the second data of the second data channel. The terminal may change to and/or may switch to the second data channel from the first data channel without terminating the streaming session established for the first data channel. A bitstream switching, a fast buffer filling and/or a fast playback start of the server and/or the terminal may be utilized by the server and/or the terminal to change to, to switch to and/or to display the second data channel. A delay time for switching to the second data channel from the first data channel and displaying the second data of the second data channel may be minimized by the bitstream switching, the fast buffer filling and/or the fast playback start the terminal.

It is generally known, for example, that a user may download, may display, may view and/or may watch a first content source via a terminal. The first content source may include first data of a first data channel which may be transmitted from a server and/or may be delivered to the terminal from the server over an internet protocol (hereinafter "IP") network. The first data of the first data channel may be streamed, may be transferred and/or may be transmitted from the server to the terminal over the IP network via a streaming session, such as, for example, a unicast streaming session and/or a multicast streaming session.

To receive the first data of the first data channel from the server, the terminal must join and/or must establish a first streaming session for the first data channel. First, the terminal must send and/or must transmit a request to the server for a description of the first streaming session to be forwarded to and/or to be transmitted to the terminal via the network. Then, the terminal must send and/or must transmit a request to the server for establishing the first data channel between the server and the terminal. Next, the terminal must send and/or must transmit a request to the server for initiating and/or for commencing a transmission of the first data of the first data channel from the server to the terminal via the first streaming session. Finally, the terminal must fill a pre-roll buffer at the terminal prior to rendering the first data to the user via an output means. As a result, a first streaming session for the first data of the first data channel is transmitted to the terminal and/or is displayed by the terminal to the user via the first streaming session and/or the output means.

The user may switch from viewing, from downloading, from displaying and/or from watching the first data channel associated with the first content source to a second data channel associated with a second content source via the terminal, the server and/or the network. However, to view the second data channel of the second content source, the terminal must terminate the first streaming session for the first data of the first data channel. Next, the terminal must tear down and/or must terminate the first streaming session between the server and the terminal for the first data channel. Then, the terminal must join and must establish a second streaming session for the second data channel as set forth above to receive the second data of the second data channel. Finally, a second stream of second data of the second data channel is transmitted to, is transferred to, is sent to and/or is displayed by the terminal via the second streaming session. As a result, the user may view, may download, may display and/or may watch the second data channel and/or the second content source via the terminal. However, a delay period of time, such as, for example, fifteen seconds may elapse from the time of the switching to and/or selecting the second content source and viewing the second data of the second data channel via the second streaming session. The delay period of time may be inconvenient to and/or may be troublesome to the user for switching from the first content source to the second content source.

A need, therefore, exists for a system and a method for transferring multiple data channels. Further, a need exists for a system and a method for transferring multiple data channels which may switch from a first data channel to a second data channel without terminating a first streaming session for the first data channel. Still further, a need exists for a system and a method for transferring multiple data channels which may switch from a first data channel to a second data channel without requiring a terminal to join and/or to establish a second streaming session for the second data channel. Moreover, a need exists for a system and a method for transferring multiple data which may utilize a bitstream switching, a fast buffer filling and/or a fast playback start of a terminal to switch from a first data channel to a second data channel. Furthermore, a need exists for a system and a method for transferring multiple data channels which may minimize a delay period of time for switching from a first data channel to a second data channel and displaying the second data channel via a terminal.

SUMMARY OF THE INVENTION

The present invention relates to a system and a method for transferring multiple data channels between a server and a terminal via a stream session over a network. More specifically, the present invention relates to a system and a method for transferring multiple data channels which may provide a bitstream switching, a fast buffer filling and/or a fast playback start of a terminal to facilitate a switch between a first data channel and a second data channel. The first data channel and/or the second data channel may be delivered to and/or may be transferred to the terminal from the server over the network via a streaming session, such as, for example, a unicast streaming session, a multicast streaming session and/or the like. The system and the method may identify the first data channel and/or the second data channel as a first track and/or a second track, respectively. The terminal may request a change for the first track and/or the second track without terminating the stream session between the terminal and the server. As a result, the system and/or the method may minimize a delay period of time for requesting a switch to the first track or the second track and displaying the first data channel or the second data channel, respectively.

In an embodiment of the present invention, a system for transferring multiple data channels is provided. The system has server storing first data and second data wherein the first data is encoded at a first bitrate and the second data is encoded at a second bitrate wherein the second bitrate is a greater bitrate than the first bitrate. Additionally, the system has a terminal electrically connected to the server via a communication network wherein the terminal and the server communicate via the communication network wherein the terminal has a buffer which receives a first portion of the second data. Further, the server establishes a streaming session with the terminal via the communication network wherein the server transmits the first data to the terminal at the first bitrate wherein the terminal displays the first data. Moreover, the server transmits the first portion of the second data to the buffer of the terminal at a third bitrate without terminating the streaming session wherein the third bitrate is a greater bitrate than the second bitrate wherein the terminal displays the first portion of the second data from the buffer at the second bitrate.

In an embodiment, the system has an output means connected to the terminal wherein the first data and the second data are displayed via the output means.

In an embodiment, the steaming session is a unicast streaming session or a multicast streaming session.

In an embodiment, the communication network is wireless.

In an embodiment, the system has a second portion of the second data which is transmitted to the terminal from the server at the second bitrate.

In an embodiment, the system has a bitstream transmitted from the server to the terminal via the streaming session wherein the portion of the second data fills the buffer of the terminal via the bitstream.

In an embodiment, the first data and the second data are video frames and audio signals.

In another embodiment of the present invention, a method for transferring multiple data channels is provided. The method has the step of storing first data and second data in a server wherein the first data is encoded at a first bitrate and the second data is encoded at a second bitrate which is a greater bitrate than the first bitrate wherein a portion of the second data is encoded at a third bitrate wherein the portion of the second data is stored in the server wherein the third bitrate is a greater bitrate than the second bitrate. Additionally, the method has the step of connecting a terminal to the server via a communication network wherein the terminal and the server communicate via the communication network wherein the terminal has a buffer which receives the portion of the second data. Further, the method has the step of transmitting a first bitstream at the first bitrate from the server to the terminal wherein the terminal receives the first data via the first bitstream wherein the terminal displays the first data. Still further, the method has the step of switching from the first data to the second data without terminating communication between the terminal and the server wherein the server transmits the portion of the second data to the terminal at the third bitrate wherein the portion of the second data fills the buffer of the terminal. Moreover, the method has the step of transmitting a second bitstream at the second bitrate from the server to the terminal wherein the terminal receives the second data via the second bitstream wherein the server transmits the second bitstream at the second bitrate after the portion of the second data from the buffer is displayed by the terminal.

In an embodiment, the method has the step of establishing a streaming session between the server and the terminal wherein the terminal receives the first bitstream and the second bitstream.

In an embodiment, the method has the step of transmitting a request from the terminal to the server wherein the request instructs the server to switch from the first bitstream to the second bitstream.

In an embodiment, the communication network is wireless.

In an embodiment, the method has the step of initiating a data channel between the server and the terminal wherein the terminal receives the first bitstream or the second bitstream from the server.

In an embodiment, the method has the step of initiating playback of the portion of the second data before the buffer is filled with the portion of the second data.

In an embodiment, the buffer of the terminal is a pre-roll buffer or a jitter buffer.

In another embodiment of the present invention, a method for transferring multiple data channels is provided. The method has the step of establishing a streaming session between a server and a terminal over a communication network wherein the server stores first data and second data wherein the server communicates the first data and the second data to the server via the streaming session wherein the terminal has a buffer which receives a portion the second data. Additionally, the method has the step of transmitting a first bitstream at a first bitrate from the server to the terminal wherein the terminal receives the first data from the server wherein the terminal displays the first data. Further, the method has the step of requesting a second bitstream from the server wherein the terminal receives the second data from the server wherein the second data is encoded at a second bitrate by the server wherein the second bitrate is a greater bitrate than the first bitrate. Moreover, the method has the step of transmitting a portion of the second data from the server to the terminal wherein the portion of the second data is transmitted to the terminal at a third bitrate without terminating the streaming session between the server and the terminal. The third bitrate is a greater bitrate than the first bitrate and the second bitrate wherein the buffer of the terminal receives the portion of the second data from the server wherein the terminal displays the portion of the second data from the buffer.

In an embodiment, the method has the step of transmitting the second bitstream at the second bitrate from the server to the terminal wherein the terminal displays the second data from the second bitstream.

In an embodiment, the method has the step of filling the buffer of the terminal with the portion of the second data received from the server at the third bitrate wherein the second data is displayed by the terminal.

In an embodiment, the method has the step of establishing a data channel between the server and the terminal wherein the terminal receives the first bitstream and the second bitstream.

In an embodiment, the method has the step of switching from the first bitstream to the second bitstream without terminating the streaming session between the server and the terminal.

In an embodiment, the communication network is wireless.

It is, therefore, an advantage of the present invention to provide a system and a method for transferring multiple data channels from a server to a terminal over a network via a streaming session between the terminal and the server.

Another advantage of the present invention is to provide a system and a method for transferring multiple data channels which may transfer, may transmit and/or may deliver a first data channel and/or a second data channel from a server to a terminal via a unicast streaming session and/or a multicast streaming session.

And, another advantage of the present invention is to provide a system and a method for transferring multiple data channels which may switch between a first data channel and a second data channel without terminating a streaming session for the first data channel between a server and a terminal.

Yet another advantage of the present invention is to provide a system and a method for transferring multiple data channels which may switch from a first data channel to a second data channel without terminating a streaming session for the first data channel and/or without joining a streaming session for the second data channel.

A further advantage of the present invention is to provide a system and a method for transferring multiple data channels which may minimize a delay period of time for requesting a switch from a first data channel to a second data channel and displaying the second data channel via a terminal and/or a streaming session.

Moreover, an advantage of the present invention is to provide a system and a method for transferring multiple data channels which may provide a bitstream switching, a fast buffer filling and/or a fast playback start of a terminal for switching between a first data channel and a second data channel.

And, another advantage of the present invention is to provide a system and a method for transferring multiple data channels which may provide a television-like service to a terminal from a server via an internet protocol network.

Yet another advantage of the present invention is to provide a system and a method for transferring multiple data channels which may facilitate a rapid channel switching between a terminal and a server.

Another advantage of the present invention is to provide a system and a method for transferring multiple data channels which may identify a first data channel and/or a second data channel as a first track encoded at a first bitrate and/or in a first configuration and/or a second track, respectively, encoded at a second bitrate and/or in a second configuration.

Yet another advantage of the present invention is to provide a system and a method for transferring multiple data channels which may identify a request to switch from a first data channel to a second data channel as a request to switch from a first track to a second track, respectively, and/or to switch from a first bitstream to a second bitstream, respectively.

A still further advantage of the present invention is to provide a system and a method for transferring multiple data channels which may prevent multiple round trip communication delays between a server and a terminal requesting to switch between a first data channel and a second data channel.

Moreover, an advantage of the present invention is to provide a system and a method for transferring multiple data channels which may deliver data via a bitstream from a server to a terminal at a rate of speed greater than a real time rate of speed by sending the data at a transmission rate of speed above an encoded bitrate of the bitstream.

And, another advantage of the present invention is to provide a system and a method for transferring multiple data channels which may provide a server for subsampling data and/or for sending the data via a bitstream to a terminal at a transmission rate of speed similar to an encoded bitrate of the bitstream.

Yet another advantage of the present invention is to provide a system and a method for transferring multiple data channels which may fill a buffer at a terminal to display video frames and/or audio signals from a bitstream and/or which may switch to a bitrate of the bitstream to display the video frames and/or the audio signals of the bitstream.

Moreover, an advantage of the present invention is to provide a system and a method for transferring multiple data channels which may provide a playback speed less than a real time rate of speed based on an arrival rate of data in a bitstream.

And, another advantage of the present invention is to provide a system and a method for transferring multiple data channels which may send seconds worth of data to a terminal and/or may send the data at a real time rate of speed.

Additional features and advantages of the present invention are described in, and will be apparent from, the detailed description of the presently preferred embodiments and from the drawings.

DETAILED DESCRIPTION OF THE PREFERRED EMBODIMENTS

Figure 1:
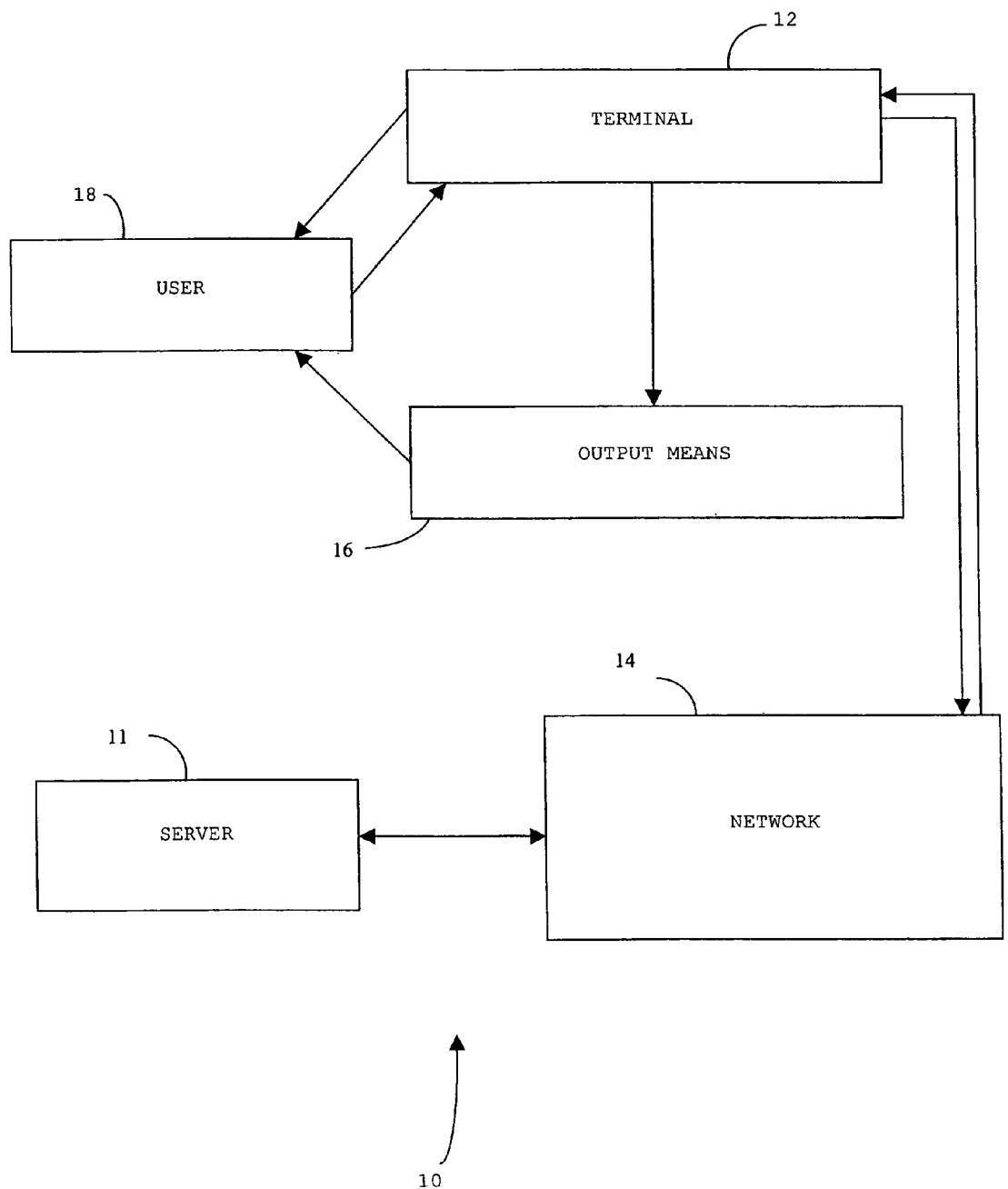
FIG. 1 illustrates a black box diagram of a system in an embodiment of the present invention.

The present invention relates to a system and a method for transferring multiple data channels between a server and a terminal over a network. The multiple data channels may have a first data channel and/or a second data channel which may provide first data from a first content source and/or second data from a second content source, respectively. The first data channel and/or the second data channel may be transmitted, may be transferred and/or may be sent from the server to the terminal via a streaming session established between the server and the terminal. The terminal and/or the server may switch between the first data channel and/or the second data channel without terminating the streaming session. The terminal may utilize a bitstream switching, a fast buffer filling and/or a fast playback start to facilitate a switching between the first data channel and/or the second data channel. The streaming session may not be terminated by the server and/or the terminal to switch between the first data channel and/or the second data channel. As a result, a delay period of time for requesting to switch to the first data channel and/or the second data channel and to display the first data channel and/or the second data channel, respectively, may be minimized by the server and/or the terminal.

Referring now to the drawings wherein like numerals refer to like parts, FIG. 1 illustrates a system 10 which may have a server 11 for transferring a first data of a first data channel and/or a second data of a second data channel to the terminal 12 via a data communication network 14 (hereinafter "the network 14"). The first data and/or the second data may be, for example, audio signals, video frames, data streams and/or the like. The first data channel and/or the second data channel may relate to a first content source and/or a second content source, respectively, and/or to a media service, such as, for example, a television service, a radio service, a cable television service, a satellite service and/or the like. The terminal 12 may be connected to and/or may be in communication with the server 11 via the network 14. The present invention should not be limited to a specific embodiment of the media service related to the first data channel and/or the second data channel.

The terminal 12 may be, for example, a computer terminal, a mobile device and/or an electronic device which may be capable of transmitting, of receiving, of processing, of accepting and/or of displaying the first data and/or the second data. Further, the mobile device may be, for example, a 3 G mobile device, an internet protocol (hereinafter "IP") video cellular telephone, a PDA, a laptop computer and/or the like. It should be understood that the terminal 12 may be any terminal capable of transmitting, capable of receiving, capable of processing and/or capable of displaying the first data and/or the second data known to one having ordinary skill in the art.

The network 14 may be, for example, an IP network, a wireless network, a wireline network, a local-area network, a wide-area network and/or the like. The terminal 12 may be remote with respect to and/or may be remotely connected to the server 11 via the network 14. The present invention should not be limited to a specific embodiment of the network 14. It should be understood that the network 14 may be any network capable of connecting and/or providing communication between the terminal 12 and the server 11 known to one having ordinary skill in the art.

The first data of the first data channel and/or the second data of the second data channel may be packetized by the server 11. The first data and/or the second data may be delivered to, may be transmitted to, may be transferred to and/or may be sent to the terminal 12 from the server 11 over the network 14. The first data and/or the second data may be streamed from the server 11 to the terminal 12 via the network 14 over a streaming session which may be established between the server 11 and the terminal 12. The streaming session may be, for example, a unicast streaming session, a multicast streaming session and/or the like. It should be understood that the invention is not limited to a specific embodiment of the streaming session.

The terminal 12 may join, may commence and/or may initiate the streaming session for the first data channel between the terminal 12 and the server 11 via the network 14. As a result, the terminal 12 may access, may receive, may request and/or may display the first data of the first data channel. The terminal 12 may transmit, may transfer and/or may send a request via the network 14 to the server 11 for forwarding a description of the streaming session to the terminal 12. The terminal 12 may receive the description of the streaming session from the server 11 via the network 14. The terminal 12 may transmit, may transfer and/or may send a request via the network 14 to the server 11 for establishing, for commencing and/or for initiating the first data channel and/or the streaming session between the terminal 12 and the server 11. As a result, the server 11 may establish, may commence and/or may initiate the first data channel and/or the streaming session between the server 11 and the terminal 12 via the network 14.

The terminal 12 may transmit and/or may send a request to the server 11 via the network 14 to transmit, to transfer and/or to communicate the first data of the first data channel from the server 11 to the terminal 12 via the network 14. The server 11 may stream, may transfer and/or may transmit the first data to the terminal 12 via the network 14. The first data received from the server 11 may fill a pre-roll buffer at the terminal 12. The pre-roll buffer at the terminal 12 may capture and/or may play the video frames associated with the first data and/or the audio signals associated with the first data via an output means 16 associated with the terminal 12. The output means 16 may be, for example, a monitor, a projector, a light emitting diode, a liquid crystal display and/or a speaker. The terminal 12 may render, may display and/or may reproduce the first data of the first data channel to a user 18 via the output means 16. The present invention should not be limited to a specific embodiment of the output means 16.

The user 18 may desire to view, to hear, to download and/or to receive the second data channel of the second content source via the terminal 12 and/or the output means 16. The user 18 may switch the streaming session from the first data channel associated with the first content source to the second data channel associated with the second content source. The server 11 may transfer, may transmit and/or may send the second data of the second data channel to the terminal 12 over the network 14 via the streaming session. The server 11 and/or the terminal 12 may utilize a bitstream switching, a fast buffer filling and/or a fast playback start to facilitate a switching between the first data of the first data channel and the second data of the second data channel. As a result, a delay period of time for requesting a switch to the second data channel and displaying and/or rendering the second data of the second data channel, respectively, via the output means 16 may be minimized by the terminal 12. As a result, the user may view, may display and/or may hear the second data of the second data channel via the output means 16 of the terminal 12.

The bitstream switching of the terminal 12 may switch from a first bitstream to a second bitstream during a transmission of the first data and/or the second data to accommodate a change in a channel condition of the first data channel and/or the second data channel. The channel condition may be, for example, a channel throughput condition, a channel noise condition and/or the like. For example, the bitstream switch may switch and/or may change from a first bitstream encoded at a first bitrate to a second bitstream encoded at a second bitrate. The first bitrate of the first bitstream may be greater than the second bitrate of the second bitstream. Switching from the first bitstream to the second bitstream may accommodate for a decrease in the channel throughput and/or may compensate for higher noise levels in the first data channel and/or the second data channel.

The bitstream switching may create and/or may produce bitstreams at multiple bitrates. The bitstreams may be created and/or may be produced simultaneously and/or may be synchronized in time. The bitstream switching may utilize an encoder to produce multiple bitstreams at different bitrates simultaneously using the first data of the first data channel and/or the second data of the second data channel. Alternatively, the bitstream switching may utilize multiple encoders that may each produce a bitstream which may be encoded at different bitrates. The terminal 12 and/or the server 11 may switch bitstreams from a first bitstream encoded at a first bitrate to a second bitstream encoded at a second bitrate. The second bitrate may be similar to a real time rate of speed as a channel condition, such as, for example, the channel throughput condition of the first data channel and/or of the second data channel may change.

For video-on-demand (hereinafter "VOD") streaming, bitstreams of the VOD streaming may be pre-encoded at multiple bitrates and may be stored as separate tracks inside a file or as a track in multiple files. The bitstream switching of the terminal 12 between different bitrates may switch from a first track encoded at a first bitrate to a second track encoded at a second bitrate within a file or may switch between two files of the multiple files. As a result, the user 18 may view the first data of the first data channel or the second data of the second data channel at one or more bitrates to accommodate the channel throughput condition of the first data channel or the second data channel, respectively. The bitstream switching may facilitate a change from the first bitstream at the first bitrate to the second bitstream at the second bitrate. Switching from the first bitstream to the second bitstream may be based on an adaptive algorithm which may measure the channel throughput condition of the first data channel and/or the second data channel. The adaptive algorithm may govern and/or may control the switching from the first bitstream to the second bitstream based on a measurement of the channel throughput condition of the first channel and/or the second channel.

The fast buffer filling and/or the fast playback start of the terminal 12 may be utilized to enable and/or to facilitate a viewing and/or a displaying of the first data and/or the second data at a first playback rate of speed which may be greater than a normal playback rate of speed. The fast buffer filling and/or the fast playback start may fill the pre-roll buffer and/or a jitter buffer of the terminal 12 with the first data and/or the second data at a buffer rate of speed which may be greater than the normal playback rate of speed. The normal playback rate of speed may be based on consumption of the first data and/or the second data by the terminal 12 and/or the output means to display, to reproduce, to render and/or to transmit the first data and/or the second data to the user 18. As a result, the terminal 12 and/or the output means 16 may initiate, may transmit, may display and/or may render the first data and/or the second data to the user 18 via the output means 16 without filling a capacity of the pre-roll buffer and/or the jitter buffer.

The server 11 may transfer, may transmit and/or may send the first data of the first data channel and/or the second data of the second data channel to the terminal 12 via the network 14. The first data of the first data channel may be delivered to the terminal 12 via the network 14 over the streaming session between the terminal 12 and the server 11. The server 11 and/or the terminal 12 may facilitate a rapid channel switch from the first data channel to the second data channel at the terminal 12.

The server 11 and/or the terminal 12 may identify and/or may recognize the first data channel and/or the second data channel as a first track and/or a second track. The first data channel may have the first data in a first bitstream and/or in a second bitstream. The second data channel may have the second data in a third bitstream and/or in a fourth bitstream. The first bitstream, the second bitstream, the third bitstream and/or the fourth bitstream may be identified by the server 11 and/or the terminal 12 as a first track, a second track, a third track and/or a fourth track, respectively. The first track, the second track, the third track and/or the fourth track may be encoded at a first bitrate, a second bitrate, a third bitrate and/or a fourth bitrate, respectively. Further, the first track, the second track, the third track and/or the fourth track may be configured in a first configuration, a second configuration, a third configuration and/or a fourth configuration, respectively. The first track, the second track, the third track and/or the fourth track may enable the terminal 12 and/or the server 11 to switch between the first data channel and the second data channel.

The terminal 12 may send and/or may transmit a request to change channels to the server 11. The request to change channels may request the server 11 to change and/or to switch from a first track or a second track to a third track or a fourth track. Alternatively, the request to change channels may request the server 11 to change from a first bitstream or a second bitstream to a third bitstream or a fourth bitstream. The server 11 may transmit, may transfer and/or may send the third channel, the fourth channel, the third bitstream and/or the fourth bitstream to the terminal 12 via the network 14 over the streaming session. The terminal 12 may receive, may display and/or may render the second data from the third track, the fourth track, the third bitstream, and/or the fourth bitstream to the user 18 via the output means 16.

The request to change channels may prevent the terminal 12 and/or the server 11 from terminating and/or from closing the streaming session. Further, the request to change channels may prevent the terminal 12 and/or the server 11 from establishing and/or from initiating a stream session for the second data channel. Still further, the request to change channels may prevent multiple round trip communication delays. As a result, the delay period of time for transmitting the request to change channels to the server and displaying the second data to the user 18 may be minimized by the request to change channels.

The server 11 may store k seconds worth of the second data for the third bitstream and/or the fourth bitstream. A maximum size of the jitter buffer in the terminal 12 may be represented by and/or may relate to a value of k. The value of k may denote and/or may relate to an amount of time which may follow a viewing time of the first data and/or the second data from the streaming session.

The user 18 may select to switch and/or to change from the first track or the second track of the first data channel to the third track and/or the fourth track of the second data channel for viewing via the terminal 12 and/or the output means 16. The server 11 may transmit, may transfer and/or may send the k seconds worth of the second data at N times the third bitrate of the third track and/or the fourth bitrate of the fourth track. As a result, the second data of the second data channel may be transferred and/or may be delivered to the terminal 12 at a delivery rate of speed greater than a real time rate of speed by sending and/or by transferring the second data at a first transmission rate of speed greater than the third bitrate of the third track and/or the fourth bitrate of the fourth track. The delivery rate of speed and/or the first transmission rate of speed may depend on and/or may be based on a ratio of an available channel bandwidth over the third bitrate of the third track and the fourth bitrate of the fourth track. A value of N may be the ratio of the available channel bandwidth versus the third bitrate of the third track and/or the fourth bitrate of the fourth track. The value of N may be, for example, a rate factor of the first transmission rate of speed for transmitting the second data at a speed great than the real time rate of speed. The available channel bandwidth may exceed the third bitrate or the fourth bitrate. As a result, the ratio may be equal to N>1 and/or the terminal 12 may receiving and/or may displaying the second data of the third track or the fourth track.

The available channel bandwidth may be similar to and/or may be equal to the third bitrate of the third track and/or the fourth bitrate of the fourth track. As a result, the ratio may be equal to N≅1. The server 11 may subsample the second data in the third track and/or the fourth track by a factor of L, and a value of L may be greater than one. The value of L may be a rate factor for subsampling the second data for transmitting the second data at the real time rate of speed. The server 11 may send and/or may transmit the second data at a second transmission rate of speed which may be similar to and/or may be equal to the third bitrate of the third track and/or the fourth bitrate of the fourth track. The server 11 may switch, may initiate and/or may resume sending and/or transferring the second data of the third bitrate or of the fourth bitrate in a real time rate of speed.

The server 11 may send and/or may transfer the k seconds worth of the second data to the terminal 12. As a result, the second data may be delivered and/or may be transferred at the delivery rate of speed which may be greater than the real time rate of speed via subsampling the second data. The server 11 may send or may transmit the second data to the terminal 12 via the streaming session at the second transmission rate of speed which may be similar to and/or may be equal to the third bitrate of the third track and/or the fourth bitrate of the fourth track. The fast buffer filling of the terminal 12 may playback and/or may display the second data at a subsampled rate of speed to allow the pre-roll buffer and/or the jitter buffer to build up from and/or to fill with the second data. The server 11 may switch and/or may change to transferring, to sending and/or to transmitting the second data to the terminal 12 at the third bitrate or the fourth bitrate. The k seconds worth of the second data may be played out, may be consumed and/or may be displayed by the terminal 12 and/or the output mean 16.

The terminal 12 may display and/or may render the second data of the third track and/or the fourth track to the user 18 at a playback rate of speed less than the real time rate of speed. As a result, the playback rate of speed for the second data may be reduced and/or may be decreased based on an arrival rate of speed of the second data from the server 11 to the terminal 12 via the streaming session. The second data of the third track or the fourth track may be delivered to the terminal 12 via the streaming session at the second transmission rate of speed which may be similar to or may be equal to the third bitrate of the third track or the fourth bitrate of the fourth track. However, the terminal 12 may display and/or may render the second data to the user 18 via the terminal 12 and/or the output means 16 at the playback rate of speed which may be less than the real time rate of speed by a factor of 1/P. A value of P may be greater than 1. The value of P may be a rate factor of the playback rate of speed for transmitting the second data in the real time rate of speed.

The terminal 12 may receive the k seconds worth of the second data from the server 11 via the network 14 over the streaming session. The terminal 12 may display and/or may render the video frames and/or the audio signals associated with the second data to the user 18 via the terminal 12 and/or the output means 16. The M seconds worth of the second data may have received from the server 11. The fast playback start of the terminal 12 may display and/or may render the video frames and/or the audio signals. A value of M may be less than the value of k. The value of M may be an amount of second of time prior to playback of the second data by the terminal 12 and/or the output means 16. The fast playback start may be utilized with and/or in conjunction with the fast buffer filling at the terminal 12 when N may be greater than one, L may be greater than one and/or P may be greater than one. After the server 11 may have sent the k seconds worth of the second data, the server 11 may begin, may initiate and/or may resume sending the second data for the second data channel at a real time rate of speed.

In an example, the values of k, N and M may be six, two and one, respectively. The server 11 may store six seconds worth of the second data via the third track or the fourth track. The server 11 may send, may transfer and/or may transmit the second data to the terminal 12 at a transmission rate of speed which may be twice the third bitrate of the third track or the fourth bitrate of the fourth track. As a result, the second data may fill the pre-roll buffer at the terminal 12 within three seconds. The terminal 12 may play, may display and/or may render the video frames and/or the audio signal associated with the second data. One second of the three seconds for filling the pre-roll buffer may have elapsed and/or may have played via the terminal 12 and/or the output means 16. The two second for filling the pre-roll buffer may continue to arrive from the server 11. After the terminal 12 may have played, may have displayed and/or may have rendered the six seconds worth of the second data in the pre-roll buffer, the terminal 12 may initiate, may begin and/or may resume playing, displaying and/or rendering the second data at the real time rate of speed.

In another example, the values of k, L and M may be six, two and one, respectively. The server 11 may store six seconds worth of the second data and/or may subsample the second data by a factor of two. The server 11 may send, may transmit and/or may transfer a subsample of the second data to the terminal 12 via the network 14 over the streaming session. The server 11 may transfer the subsample of the second data to the terminal 12 at a transmission rate of speed which may be equal to the third bitrate of the third track or the fourth bitrate of the fourth track. As a result, the second data may fill the pre-roll buffer at the terminal 12 within three seconds. The terminal 12 may play, may display and/or may render the second data to the user 18 via the terminal 12 and/or the output means 16. The terminal 12 may display and/or may render the second data via the terminal 12 and/or the output means 16. One second of the three seconds for filling the pre-roll buffer may have elapsed and/or may have played via the terminal 12 and/or the output means 16. The two seconds worth of the second data for filling the pre-roll buffer may continue to arrive from the server 11 via the streaming session. After the terminal 12 may have displayed and/or may have rendered the six seconds worth of the second data in the pre-roll buffer, the terminal 12 may initiate and/or may resume displaying and/or rendering the second data to the user 18 via the terminal 12 and/or the output means 16 at the real time rate of speed.

In yet another example, the values for k, P and M may be equal to three, two and one, respectively. The server 11 may store three seconds worth of the second data and/or may send, may transfer and/or may transmit the second data to the terminal 12 in the third track or the fourth track via the network 14 over the streaming session. The server 11 may transfer and/or may send the second data to the terminal 12 at the transmission rate of speed which may be equal to the third bitrate of the third track and/or the fourth bitrate of the fourth track. As a result, the second data may fill the pre-roll buffer at the terminal 12 within three seconds. The terminal 12 may play, may display and/or may render the second data to the user 18 via the terminal 12 and/or the output means 16. The terminal 12 may display and/or may render the second data after one second of the three seconds for filling the pre-roll buffer may have elapsed. The terminal 12 may display and/or may render the second data at the playback rate of speed which may be equal to half of an original intended presentation time frame. The two seconds for filling the pre-roll buffer may continue to arrive from the server 11. After the terminal 12 may have played, may have displayed and/or may have rendered the three seconds worth of second data in the pre-roll buffer, the server 11 may initiate and/or may resume displaying and/or rendering the second data in the real time rate of speed. The present invention should not be deemed as limited to a specific embodiment of the values of k, N, L, and/or M.

The system 10 may transfer, may transmit and/or may send multiple data channels from the server 11 to the terminal 10 over the network 14. The multiple data channels may have the first data channel and/or the second data channel which may provide the first data from the first content source and/or the second data from the second content source, respectively. The first data channel and/or the second data channel may be transmitted, may be transferred and/or may be sent from the server 11 to the terminal 12 via a streaming session which may be established between the server 11 and the terminal 12. The terminal 12 and/or the server 11 may switch between the first data channel and/or the second data channel without terminating the streaming session. The terminal 12 and/or the server 11 may utilize a bitstream switching, a fast buffer filling and/or a fast playback start to facilitate switching between the first data channel and/or the second data channel.

The first data of the first data channel may be transferred to the terminal 12 via the first track encoded at the first bitrate and/or configured in the first configuration and/or the second track encoded at the second bitrate and/or configured in the second configuration. The second data of the second data channel may be transferred to the terminal 12 via the third track encoded at the third bitrate and/or configured in the third configuration and/or a fourth track encoded at the fourth bitrate and/or configured in the fourth configuration. The streaming session may not be terminated by the server 11 and/or the terminal 12 to switch between the first data channel and/or the second data channel. As a result, the delay period of time for requesting to switch to the first data channel and/or the second data channel and displaying the first data channel and/or the second data channel, respectively, may be minimized by the server 11 and/or the terminal 12.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A method for transferring multiple data channels, the method comprising the following computer-implemented steps:

establishing a streaming session between a server and a terminal over a communication network that has an available bandwidth wherein the server stores first data encoded at a first bitrate and second data encoded at a second bitrate and further, wherein the first data represents different media content than the second data, wherein the server communicates the first data and the second data to the terminal via the streaming session, and wherein the terminal has a buffer;

transmitting the first data from the server to the terminal in the streaming session, wherein the terminal displays the first data;

requesting the second data from the server in response to user input using the terminal during the streaming session, wherein the user input requests a switch from the first data to the second data, and wherein the terminal requests the second data in response to the user input;

subsampling the second data after the terminal requests the second data, wherein the server subsamples a first portion of the second data that was encoded at the second bitrate to generate a subsampled first portion of the second data that represents an encoding of the first portion of the second data at a third bitrate that is less than the second bitrate;

transmitting the subsampled first portion of the second data from the server to the terminal without terminating the streaming session between the server and the terminal, wherein the subsampled first portion of the second data is transmitted to the terminal at a fourth bitrate which is greater than the third bitrate, wherein the buffer of the terminal receives the subsampled first portion of the second data from the server, wherein the first portion of the second data is a size that is based on a size of the buffer of the terminal, and further wherein the server terminates transmission of the first data and initiates transmission of the subsampled first portion of the second data substantially simultaneously in response to the terminal requesting the second data;

displaying the subsampled first portion of the second data on the terminal wherein the terminal displays the subsampled first portion of the second data using the buffer; and displaying a second portion of the second data on the terminal wherein the terminal obtains the second portion of the second data at the second bitrate from the server after the terminal receives the subsampled first portion of the second data.

2. The method of claim 1 wherein the fourth bitrate is approximately equal to the available bandwidth.

3. The method of claim 1 further comprising the step of:
   transmitting the second portion of the second data at the second bitrate from the server to the terminal after transmission of the subsampled first portion of the second data.

4. The method of claim 1 wherein a first content source and a second content source that are different content sources are connected to the server wherein the first content source transmits the first data to the server in a first data channel and the second content source transmits the second data to the server in a second data channel wherein the server transmits the first portion of the second data in response to selection of the second data channel.

5. The method of claim 1 wherein the first data is a first set of video frames and audio signals and further wherein the second data is a second set of video frames and audio signals.

6. The method of claim 1 wherein the terminal is a mobile device.

7. The method of claim 1 wherein the communication network is wireless.

8. The method of claim 1 further comprising the step of:
   initiating playback of the first portion of the second data before the buffer is filled with the first portion of the second data.

9. The method of claim 1 wherein the first data is a first set of audio signals and further wherein the second data is a second set of audio signals.

* * * * *